United States Patent Office 3,055,861
Patented Sept. 25, 1962

3,055,861
STABILIZED ACRYLONITRILE VINYL OR VINYLI-
DENE COPOLYMER SOLUTIONS
Solomon P. Hersh, Charleston, and George W. Fowler, South Charleston, W. Va., assignors to Union Carbide Corporation, a corporation of New York
No Drawing. Filed Feb. 19, 1958, Ser. No. 716,039
4 Claims. (Cl. 260—45.7)

The present invention relates to stabilized resin compositions prepared from halogen-containing olefins and to processes for producing such stabilized resin compositions. More particularly, the invention relates to new and improved stabilizing materials which show definite advantage in increasing the resistance of halogen-containing olefin resins to discoloration.

Halogen-containing olefin resins are well known to the art and find use in a number of diverse applications. Noteworthy among these uses is the role such resins play in the production or manufacture of synthetic fibers. It is also well known that resin compositions prepared from halogen-containing olefins are sensitive to heat and light as manifested by discoloration. Thus, for example, in the production of synthetic fibers from such resin compositions, the resin is ordinarily dissolved in a suitable organic solvent and maintained in solution at elevated temperatures for prolonged periods of time during the spinning operation. During these procedures, the color of the hot resin solution generally undergoes a progressive yellowing or darkening which undesirably affects the initial color of the fibers ultimately produced. Moreover, a continued gradual development of color in these fibers usually can also be observed upon exposure to light, or when the fibers are subsequently subjected to high temperatures as during the ironing or pressing of fabrics prepared from the fibers.

While the initial stages of color development reached during formation or subsequent treatment of the resin compositions may not materially detract from some qualities of the resin, they frequently are sufficient to restrict many uses of the resin. Consequently, continued color development in the resin compositions becomes increasingly undesirable. It is therefore customary to incorporate in halogen-containing olefin resin compositions small amounts of stabilizing materials for the purpose of retarding or inhibiting discoloration.

Heretofore, a considerable number of compounds designed to function as stabilizers for this purpose have been proposed, for example, lead and calcium salts of the higher fatty acids, alcoholates of the alkaline earth metals, mono- and dialkyl phosphites, tri-(2-chloroethyl) phosphite, di- and triaryl phosphites, various organotin compounds such as dioctyltin maleate, etc. Unfortunately, however, many of these compounds have not been found entirely satisfactory in minimizing the discoloration of halogen-containing olefin resin compositions upon prolonged exposure to the action of either elevated temperatures or light. This is particularly true when the resin is in solution, as in the instance of spinning "dopes" used for the production of synthetic fibers.

Accordingly, one or more of the following objects can now be achieved through the practice of the present invention, thus overcoming disadvantages of the prior art.

It is an object of this invention to provide halogen-containing olefin resin compositions which show improved resistance to discoloration upon exposure to heat or light. It is another object of the invention to provide solutions of resins prepared from halogen-containing olefins, and articles produced therefrom, which evidence a minimized tendency toward discoloration upon exposure to heat or light. A further object of the invention is to provide novel and improved stabilizing materials which increase the resistance of certain halogen-containing olefin resins to discoloration upon exposure to heat or light. Still another object of the invention is to provide a novel process for retarding or inhibiting the discoloration of certain halogen-containing olefin resins upon exposure to heat or light. Other objects will become apparent in light of the following description.

The present invention is particularly concerned with the stabilization of halogen-containing vinyl resins of the type prepared by the conjoint polymerization of vinyl chloride or vinylidine chloride, or both, with acrylonitrile. Within the broader class of these resins, conjointly polymerized vinyl chloride or vinylidene chloride, or both, with acrylonitrile, containing in the resin from about 15 percent to about 70 percent of the chlorine-containing monomer by weight, are especially susceptible to stabilization by the materials hereinafter described. Included among the resin compositions contemplated by the invention are solutions of these resins, such as those in common usage as spinning "dopes" for the production of synthetic fibers, wherein the resin is dissolved in a suitable inert organic solvent, for example, acetonitrile, acetone, the N,N-dialkyl formamides and acetamides, ethylene carbonate, cyclohexanone, etc., or any other inert organic solvent for the resin which will not react with the stabilizer employed or the resin itself.

In accordance with the invention, it has been found that certain triorgano-phosphorus compounds containing trivalent phosphorus will function as excellent stabilizers for the resin compositions described herein. More particularly, the triorgano-phosphorus compounds of this invention can be represented by the general formula:

(I) 

wherein X, X¹ and X² each represents either a hydrocarbyl radical, i.e., a radical containing only carbon and hydrogen atoms, such as alkyl, alkenyl, aryl, alkaryl, aralkyl, cycloalkyl or cycloalkenyl radical, or a hydrocarbyloxy radical corresponding thereto, such as an alkoxy, alkenoxy, aryloxy, alkaryloxy, aralkoxy, cycloalkoxy, or cycloalkenoxy radical, and wherein when one or more of the radicals represented by either X, X¹ or X² are hydrocarbyloxy radicals, at least one such hydrocarbyloxy radical contains an aliphatic carbon atom attached to the oxygen atom of the hydrocarbyloxy radical connected to the phosphorus atom. In addition, the hydrocarbyl or hydrocarbyloxy radicals can also be substituted by hydroxy, alkoxy, aryloxy, carbalkoxy or acyloxy radicals. As hereinafter employed, the term "substituted" refers specifically to the inclusion of these latter radicals as substituents on the hydrocarbyl or hydrocarbyloxy nucleus.

When incorporated in the halogen-containing vinyl resin compositions hereinabove described, these triorgano-phosphorus compounds are effective in substantially preventing the discoloration of the resin compositions upon exposure to heat or light. In this manner, for example, the discoloration of fiber-spinning solutions prepared in accordance with the present invention can now be minimized during conventional spinning operations. In addition, synthetic fibers can be obtained from these solutions having a good initial whiteness, i.e., low color, and which demonstrate improved stability upon subsequent exposure to heat and light.

Included among the triorgano-phosphorus compounds found to be effective as stabilizer for the purposes of this invention are triorgano phosphites (II) represented by the general formula:

(II) 

wherein R, R¹ and R² each represents either an unsubstituted or substituted hydrocarbyl radical, and wherein at least one hydrocarbyl radical is attached to the oxygen atom by an aliphatic carbon atom, for example, unsubstituted and substituted alkyl, alkenyl, aryl, alkaryl, aralkyl, cycloalkyl and cycloalkenyl radicals containing up to about 22 carbon atoms and preferably up to about 12 carbon atoms, such as, methyl, ethyl, butyl, pentyl, hexyl, ethylhexyl, isooctyl, decyl, dodecyl, hexadecyl, propenyl, methylpropenyl, butenyl, pentenyl, hexenyl, octadecenyl, cyclopentyl, cyclohexyl, cyclohexenyl, phenyl, biphenyl, naphthyl, methylphenyl, ethylphenyl, phenylethyl, phenylhexyl, cyclohexylphenyl, hydroxyethyl, hydroxydodecyl, methoxyethyl, ethoxybutyl, phenoxyhexyl, carbethoxyethyl, propionoxyoctyl, benzoxyhexyl, ethoxybutenyl, phenoxybutenyl, carbethoxyhexenyl, propionoxypentenyl, benzoxyhexenyl, hydroxyphenyl, methoxyphenyl, carbethoxyphenyl radicals and the like. Particularly good results can be obtained when the triorgano-phosphorus compound employed in this invention is a trialkyl phosphite.

Also included among the triorgano-phosphorus compounds are the triorgano phosphonites (III) represented by the general formula:

(III) 

wherein R, R¹ and R² each represents either an unsubstituted or substituted hydrocarbyl radical as defined above, and wherein at least one of the hydrocarbyl radicals represented by either R¹ or R² is attached to the oxygen atom by an aliphatic carbon atom.

Another group of triorgano-phosphorus compounds included within the scope of the present invention are the triorgano phosphonites (IV) represented by the general formula:

(IV) 

wherein R, R¹ and R² each represents either an unsubstituted or substituted hydrocarbyl radical as defined above, and wherein the hydrocarbyl radical represented by R² is attached to the oxygen atom by an aliphatic carbon atom.

A further group of triorgano-phosphorus compounds included within the scope of this invention are the triorgano phosphines (V) represented by the general formula:

(V) 

wherein R, R¹ and R² each represents either an unsubstituted or substituted hydrocarbyl radical as defined above. In this group of triorgano-phosphorus compounds, the limitation as to an aliphatic carbon atom attached to an oxygen atom connected to a phosphorus atom does not apply, since in the triorgano phosphines, oxygen is not connected to phosphorus.

It is to be noted that the triorgano-phosphorus compounds of this invention can also be cyclic in configuration. Included within this group of cyclic triorgano-phosphorus compounds are the 1,3,2-dioxaphospholanes (VI) represented by the general formula:

(VI) 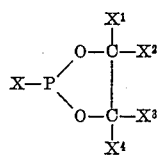

wherein X, X¹, X², X³ and X⁴ each represents either an unsubstituted or substituted hydrocarbyl radical or an unsubstituted or substituted hydrocarbyloxy radical as hereinabove defined for X, X¹ and X², containing up to about 22 carbon atoms and preferably up to about 12 carbon atoms. Also included within the group of cyclic triorgano-phosphorus compounds are the 1,3,2-dioxaphosphorinanes (VII) represented by the general formula:

(VII) 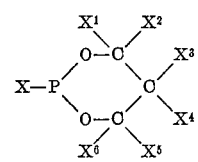

wherein X, X¹, X², X³, X⁴, X⁵ and X⁶ each represents either an unsubstituted or substituted hydrocarbyl radical or an unsubstituted or substituted hydrocarbyloxy radical as hereinabove defined for X, X¹ and X², containing up to about 22 carbon atoms and preferably up to about 12 carbon atoms. In these cyclic triorgano-phosphorus compounds, at least two oxygen atoms connected to the phosphorus atom are attached to aliphatic carbon atoms.

Illustrative of the triorgano-phosphorus compounds suitable for use in the present invention are the following:

Triethyl phosphite,
Tributyl phosphite,
Triisobutyl phosphite,
Tripentyl phosphite,
Trihexyl phosphite,
Tri-(2-ethylhexyl) phosphite,
Triisooctyl phosphite,
Tridecyl phosphite,
Tridodecyl phosphite,
Diethyl butyl phosphite,
Tripropenyl phosphite,
Tri-(2-methylpropenyl) phosphite,
Trioctadecenyl phosphite,
Dipropenyl butyl phosphite,
Dipropenyl phenyl phosphite,
Diphenyl ethyl phosphite,
Dibutyl phenyl phosphite,
2-methylphenyl dibutyl phosphite,
2-phenylethyl dihexyl phosphite,
Tri-(8-hydroxyoctyl) phosphite,
Di-(2-hydroxyphenyl) butyl phosphite,
Tri-(2-ethoxyethyl) phosphite,
4-phenoxybutyl dibutyl phosphite,
Tri-(2-phenoxyethyl) phosphite,
Tri-(2-carboxyethyl) phosphite,
Tri-(3-acetoxy propyl) phosphite,
2-methoxyphenyl dibutyl phosphite,
Tributyl phosphonite,
Dibutyl phenylphosphonite,
Tridodecyl phosphonite,
Didodecyl phenylphosphonite,
Dihexyl propenylphosphonite,
Tripropenyl phosphonite,
Tri-(2-methylpropenyl) phosphonite,
Tri-(2-hydroxyethyl) phosphonite,
Di-(2-methoxyethyl) phenylphosphonite,
Dihexyl 2-ethoxyphenylphosphonite,
Tri-(6-carbethoxyhexyl) phosphonite,
Di-(4-acetoxybutyl) phenylphosphonite,
Trietyl phosphinite, Trihexyl phosphinite,
Tridodecyl phosphinite,
Butyl dipropenylphosphinite,
Butyl diphenylphosphinite,
Tripropenyl phosphinite,
Tri-(1-methylpropenyl) phosphinite,
2-methylpropenyl diphenylphosphinite,
Tri-(2-hydroxyethyl) phosphinite,
6-methoxyhexyl diphenylphosphinite,
Tri-(2-carbethoxyethyl) phosphinite,
4-acetoxybutyl dipropenylphosphinite,
Tributyl phosphine,
Trihexyl phosphine,
Tridodecyl phosphine,
Diethyl butyl phosphine,
Tripropenyl phosphine,
Tri-(2-methylpropenyl) phosphine,
Triehxenyl phosphine,
Trioctadecenyl phosphine,
Dipropenyl butyl phosphine,
Triphenyl phosphine,
Tri-(2,4-dimethylphenyl) phosphine,
Tri-(2-phenylethyl) phosphine,
Diphenyl hexyl phosphine,
Dipropenyl phenyl phosphine,
Tri-(6-hydroxyhexyl) phosphine,
Tri-(2-methoxyethyl) phosphine,
Tri-(3-methoxyphenyl) phosphine,
Tri-(2-carboxyethyl) phosphine,
Tri-(2-acetoxypropyl) phosphine,
4-phenoxyphenyl dimethyl phosphine,
4-methoxyphenyl dipropenyl phosphine,
2-ethyl-1,3,2-dioxaphospholane,
2-propenyl-1,3,2-dioxaphospholane,
2-phenyl-1,3,2-dioxaphospholane,
2-decyloxy-1,3,2-dioxaphospholane,
2-(2-hydroxyethoxy)-1,3,2-dioxaphospholane,
2-phenoxy-4-methyl-1,3,2-dioxaphospholane,
2-phenoxy-4-methoxy-1,3,2-dioxaphospholane,
2-(2-methoxyethyl)-5-acetoxy-1,3,2-dioxaphospholane,
2-hexyl-4,5-diethyl-1,3,2-dioxaphospholane,
2-dodecyl-4-phenylethyl-1,3,2-dioxaphospholane,
2-methoxy-5-ethyl-4-propyl-1,3,2-dioxaphosphorinane,
2-phenoxy-4,4,6-trimethyl-1,3,2-dioxaphosphorinane,
2-methyl-4-methoxymethyl-1,3,2-dioxaphosphorinane, and the like.

The triorgano-phosphorus compounds of this invention are effective as stabilizers when incorporated in the halogen-containing vinyl resin compositions in small amounts effecting concentrations in the resin compositions of from about 0.01 percent to about 1.0 percent phosphorus by weight of resin. The concentration of stabilizer to be employed is therefore a function of the molecular weight of the particular triorgano-phosphorus compound utilized. Especially good results are obtained when the triorgano-phosphorus compounds are present in the resin compositions in amounts effecting concentrations of from about 0.05 percent to about 0.3 percent phosphorus by weight of resin. Little increase in the resistance of the resin compositions to discoloration by heat or light is realized by the use of stabilizer concentrations above this preferred range, while the stability of the resin compositions decreases proportionally with decreasing stabilizer concentrations below this range. Although the stabilizers can be employed in amounts effecting concentrations of phosphorus in the resin compositions in excess of about 1.0 percent by weight of resin, attendant disadvantages, such as bad odor or alteration of the physical properties of the resin, generally prevents the satisfactory utilization of the stabilized resin compositions so obtained.

The method of incorporating the triorgano-phosphorus compounds in the resin compositions is not critical to the invention. For example, when it is desired to provide stabilized resin solutions such as those in common usage as spinning "dopes" for the production of synthetic fibers, the triorgano-phosphorus compounds are preferably added to the resin solvent prior to the addition of resin. However, the stabilizers can also be added during or following the dissolution of the resin in the solvent.

The stabilized resin solutions prepared in accordance with the present invention evidence little if any discoloration during fiber spinning operations, thus resulting in the production of synthetic fibers having a high degree of initial whiteness and low color. In addition, the presence of the stabilizing materials in the fibers so produced thereby inhibits discoloration when the fibers are subsequently subjected to high temperatures or exposed to light. Bleaching of the fibers during early exposure periods to light, heretofore frequently encountered with certain halogen-containing olefin resins, is also substantially eliminated. The solubility of the triorgano-phosphorus compounds in conventional solvents such as acetonitrile, acetone, dimethyl formamide, etc. facilitates the spinning operation and avoids the necessity of working with a two-phase spinning solution.

The utility and advantages of the stabilizers of this invention, as well as of the resin compositions stabilized therewith, will further become apparent from the following examples included to illustrate the best modes of practicing the invention that are now contemplated.

EXAMPLE I

A series of experiments was conducted to demonstrate the stabilizing action of various triorgano-phosphorus compounds. Each experiment was carried out as follows. One hundred fifty grams of acetone were introduced to a one-pint pressure bottle and cooled by placing the bottle in an acetone-"Dry Ice" bath for about 30 minutes or until the temperature of the acetone reached approximately −20° C. One gram of the particular stabilizer utilized in each experiment was subsequently dissolved in the acetone, and to this cool solution, 50 grams of a copolymer of vinyl chloride (60 percent) and acrylonitrile (40 percent), having a molecular weight such that the specific viscosity of an 0.2 percent solution of the resin in cyclohexanone at a temperature of 20° C. was 0.261 were then added. The bottle containing the solvent, stabilizer and resin was capped, enclosed in a protective fabric bag and placed in a tumbling water bath at a temperature of 50° C. for about 30 minutes to effect solvation of the resin. Heating was continued for two hours at a temperature of 80° C. whereby a clear resin solution was obtained containing 25 percent solids and suitable for the spinning of synthetic fibers. The color of the resin solution was then determined quantitatively by measuring the transmission of light at a wave length of 430 millimicrons through a solution containing 4 percent resin and 12 percent acetone by weight, and prepared by weighing out approximately 5 grams of the resin solution into a two-ounce glass vial and adding thereto a volume of dimethyl formamide which in cubic centimeters was equal to 5.3 times the weight of the resin solution in grams.

The results obtained from these experiments are tabulated below in Table A. Included in the table for comparison are results obtained from similar experiments, in which, however, stabilizers other than those included within the scope of this invention such as dioctyltin maleate, tri-(2-chloroethyl) phosphite, dibutyl phosphite, di-(2-ethylhexyl) phosphite, diphenyl phosphite, diisopropyl phosphite, 2-ethylhexyl octylphenyl phosphite and triphenyl phosphite, were employed. Also included in the table are results obtained from control samples containing unstabilized resin solutions. One such control was prepared as described above but was not subjected to heat treatment. In the table, "color values" represent the percent transmission of light at a wave length of 430 millimicrons through the resin solution, with high "color values" being preferred. In certain instances Gardner values are also indicated. Higher Gardner values correspond to yellower or darker resin solutions. The "color values" for the stabilized resin solutions were in all instances, measured after heat treatment.

*Table A*

| Stabilizer | Color values | Gardner values |
|---|---|---|
| Controls: | | |
| None (unheated resin solution) | 87 | |
| None (heated resin solution) | 63 | 9+ |
| Triorgano-phosphorus compounds: | | |
| Triethyl phosphite | 84 | 5 |
| Tripentyl phosphite | 85 | |
| Tributyl phosphite | 84 | 5 |
| Tri-(2-ethylhexyl) phosphite | 84 | |
| Trihexyl phosphite | 84 | |
| Triisooctyl phosphite | 84 | |
| Tridecyl phosphite | 84 | |
| Tridodecyl phosphite | 83 | |
| Tripropenyl phosphite | 83 | |
| Tri-(2-methylpropenyl) phosphite | 83 | |
| Dipropenyl phenyl phosphite | 81 | |
| Diphenyl methyl phosphite | 79 | |
| Dibutyl phenyl phosphite | 77 | |
| Tri-(2-phenoxyethyl) phosphite | 84 | |
| Tributyl phosphine | 86 | |
| Triphenyl phosphine | 76 | |
| Dibutyl phenylphosphonite | 84 | |
| 2-(2-hydroxyethoxy)-1,3,2-dioxaphospholane | 74 | |
| 2-methoxy-4-propyl-5-ethyl-1, 3, 2-dioxaphosphorinane | 84 | |
| 2-phenoxy-4, 4, 6-trimethyl-1, 3, 2-dioxaphosphorinane | 72 | |
| Other stabilizers: | | |
| Dioctyltin maleate | 74 | 7+ |
| Tri-(2-chloroethyl) phosphite | 69 | 7+ |
| Dibutyl phosphite | | 10+ |
| Di-(2-ethylhexyl) phosphite | | 10+ |
| Diphenyl phosphite | 65 | 10+ |
| Diisopropyl phosphite | 66 | |
| 2-ethylhexyl octylphenyl phosphite | 70 | |
| Triphenyl phosphite | 69 | 9+ |

From the above table the improved resistance to discoloration that is obtained when utilizing the stabilizers of this invention is readily apparent. Those resin solutions having lower resistance to discoloration possess higher Gardner values and lower "color values," the latter signifying the transmission of less light through the solutions as a result of increased color development during heat treatment.

Additional experiments were performed as described above in which, however, in one group unchilled acetonitrile was substituted for acetone as the solvent, and in another group, unchilled dimethyl formamide was employed as solvent. The results obtained from these experiments are shown in Table B. The "color values" for the stabilized resin solutions were in all instances measured after heat treatment.

*Table B*

| Stabilizer | Color values in acetonitrile solution | Color values in dimethyl formamide solution |
|---|---|---|
| Controls: | | |
| None (unheated resin solution) | 87 | 87 |
| None (heated resin solution) | 67.5 | 61.5 |
| Triorgano-phosphorus compounds: | | |
| Tributyl phosphite | 84.5 | 85.0 |
| Triisooctyl phosphite | 83.5 | 83.5 |
| Other stabilizers: | | |
| Dioctyltin maleate | 77 | 76.5 |
| Dibutyl phosphite | 70 | 67 |

EXAMPLE II

A series of experiments was conducted in a manner similar to that described in Example I, modified as indicated below. Unchilled acetonitrile was substituted for acetone as solvent in one group of experiments and unchilled dimethyl formamide was employed as solvent in another group. The resin used in this series of experiments was a terpolymer of vinyl chloride (20 percent), vinylidine chloride (11 percent) and acrylonitrile (69 percent), having a molecular weight such that the specific viscosity of an 0.2 percent solution of the resin in dimethyl formamide at a temperature of 29° C. was 0.334. The resin was added to the solvent at room temperature and solvation carried out by heating at a temperature of 90° C. for about 30 minutes, followed by an additional heating period of about three hours at the same temperature. The results obtained from the experiments, tabulated below in Table C, again indicate the improved resistance to discoloration that is obtained when utilizing the stabilizers of this invention. The "color values" for the stabilized resin solutions were in all instances measured after heat treatment.

*Table C*

| Stabilizer | Color values in acetonitrile solution | Color values in dimethyl formamide solution |
|---|---|---|
| Controls: | | |
| None (unheated resin solution) | 89 | 89 |
| None (heated resin solution) | 81.5 | 61.5 |
| Triorgano-phosphorus compounds: | | |
| Tributyl phosphite | 85 | 77 |
| Trihexyl phosphite | 84.5 | |
| Tri-(2-ethylhexyl) phosphite | 84.5 | |
| Triisooctyl phosphite | | 86 |
| Other stabilizers: | | |
| Dioctyltin maleate | 81 | 55.5 |
| Dibutyl phosphite | | 67.5 |

EXAMPLE III

A series of experiments was conducted in a manner similar to that described in Example I, modified as indicated below. Unchilled acetonitrile was substituted for acetone as the solvent. Tht resin used in this series of experiments was a copolymer of vinyl chloride (33 percent) and acrylonitrile (67 percent) having a molecular weight such that the specific viscosity of an 0.2 percent solution of the resin in dimethyl formamide at a temperature of 20° C. was 0.372. The results obtained from the experiments, tabulated below in Table D, further indicate the improved resistance to discoloration that is obtained when utilizing the stabilizers of this invention. The "color values" for the stabilized resin solutions were in all instances measured after heat treatment.

*Table D*

Stabilizer: Color values
  Controls:
    None (unheated resin solution) _____ 82.0
    None (heated resin solution) _____ 70.5
  Triorgano-phosphorus compounds:
    Tributyl phosphite _____ 74.5
    Trihexyl phosphite _____ 74.5
    Tri-(2-ethylhexyl) phosphite _____ 77.0
  Conventional stabilizers:
    Dioctyltin maleate _____ 73.0
    Dibutyl phosphite _____ 68.0

EXAMPLE IV

A series of experiments were conducted in a manner similar to that described in Example I using the same resin and solvent described therein, modified as indicated below. The stabilizers employed were triethyl phosphite, tributyl phosphite, trihexyl phosphite, tri-(2-ethylhexyl) phosphite and triisooctyl phosphite. The experiments were carried out utilizing each stabilizer in concentrations of 0.25, 0.5, 1.0, and 2.0 percent phosphite by weight of resin. The results obtained from the heated resin solutions are tabulated below in Table E. In the table, stabilizer concentrations are indicated both as percent phosphite and as percent phosphorus by weight of resin in the solutions.

Table E

TRIETHYL PHOSPHATE

| Concentration of phosphite (Percent) | Concentration of phosphorus (Percent) | Color values |
|---|---|---|
| 0.25 | 0.047 | 70 |
| 0.5 | 0.094 | 84 |
| 1.0 | 0.19 | 84 |
| 2.0 | 0.37 | 84 |

TRIBUTYL PHOSPHITE

| | | |
|---|---|---|
| 0.25 | 0.031 | 66 |
| 0.5 | 0.062 | 74 |
| 1.0 | 0.12 | 83 |
| 2.0 | 0.25 | 84 |

TRIHEXYL PHOSPHITE

| | | |
|---|---|---|
| 0.25 | 0.023 | 66 |
| 0.5 | 0.046 | 74 |
| 1.0 | 0.093 | 82 |
| 2.0 | 0.19 | 84 |

TRIISOOCTYL PHOSPHITE

| | | |
|---|---|---|
| 0.25 | 0.019 | 64 |
| 0.5 | 0.037 | 68 |
| 1.0 | 0.074 | 77 |
| 2.0 | 0.15 | 84 |

TRI-(2-ETHYLHEXYL) PHOSPHITE

| | | |
|---|---|---|
| 0.25 | 0.019 | 64 |
| 0.5 | 0.037 | 68 |
| 1.0 | 0.074 | 79 |
| 2.0 | 0.15 | 84 |

From the table it may be seen that the stabilizers of this invention are essentially equivalent in their ability to improve resistance to discoloration when present in amounts effecting equal concentrations of phosphorus in the resin solutions, the concentration of phosphorus present being a function of the molecular weight of the particular stabilizer employed.

It can also be observed from the table that the use of the stabilizers in amounts effecting concentrations of greater than about 0.1 percent phosphorus by weight of resin in the solution does not substantially further improve the color characteristics of the resin solution, the "color values" of the solutions being essentially constant at higher concentrations. It is to be noted in this respect, however, that the use of higher stabilizer concentrations generally will permit maintaining the resin solutions at a desirable color level for prolonged periods of time. This may be seen from the following example.

EXAMPLE V

A series of experiments was conducted in a manner similar to that described in Example I, using the same resin and solvent described therein. In this series of experiments tri-(2-ethylhexyl) phosphite was incorporated in the solutions in concentrations of 0.25, 0.5, 1.0, 2.0 and 3.0 percent phosphite by weight of resin, corresponding to concentrations of phosphorus in the resin solutions of 0.019, 0.037, 0.074, 0.14 and 0.22 percent by weight of resin respectively. For each run, the length of time during which the stabilized resin solution could be maintained at a temperature of 80° C. without having the "color value" drop below 84 was determined. The results obtained are tabulated below in Table F. In the table, the concentrations are indicated both as percent phosphite and as percent phosphorus by weight of resin in solution; the time is indicated in minutes.

Table F

| Concentration of phosphite (percent) | Concentration of phosphorus (percent) | Time (min.) |
|---|---|---|
| 0.25 | 0.019 | 10 to 20 |
| 0.5 | 0.037 | 30 to 60 |
| 1.0 | 0.074 | 90 to 120 |
| 2.0 | 0.14 | 120 |
| 3.0 | 0.22 | 180 |

From the table it can be seen that where greater quantities of stabilizer are used, good color characteristics for the resin solution can be maintained for longer periods of time; conversely, with lesser quantities, good color characteristics can still be realized, but for shorter periods of time.

EXAMPLE VI

A series of experiments was conducted in a manner similar to that described in Example I, modified as indicated below. Unchilled acetonitrile was substituted for acetone as solvent. The resin employed was a copolymer of vinylidine chloride (44 percent) and acrylonitrile (56 percent), having a molecular weight such that the specific viscosity of an 0.2 percent solution of the resin in dimethyl formamide at a temperature of 29° C. was 0.414. The results obtained from the experiments, shown below in Table G, further indicate the improved resistance to discoloration that is obtained when utilizing the stabilizers of this invention. The "color values" for the stabilized resin solutions were in all instances measured after heat treatment.

Table G

Stabilizer: Color values
  Control:
    None (unheated resin solution) _____ 81.0
    None (heated resin solution) _____ 70.0
  Triorgano-phosphorus compounds:
    Tributyl phosphite _____ 86.0
    Trihexyl phosphite _____ 83.0
    Tri-(2-ethylhexyl) phosphite _____ 81.0
  Other stabilizers:
    Tri-(2-chloroethyl) phosphite _____ 76.5
    Dibutyl phosphite _____ 77.5

EXAMPLE VII

A series of experiments was conducted in a manner similar to that described in Example I, modified as indicated below. Unchilled acetonitrile was substituted for acetone as solvent in one group of experiments, and unchilled dimethyl formamide used as solvent in another group. The resin employed in this series of experiments was a copolymer of vinylidine chloride (46 percent) and acrylonitrile (54 percent) having a molecular weight such that the specific viscosity of an 0.2 percent solution of the resin cyclohexanone at a temperature of 20° C. was 0.254. The results obtained from the experiments, tabulated below in Table H, again illustrate the improved resistance to discoloration that is obtained when using the stabilizers of this invention. The "color values" for the stabilized resin solutions were in all instances measured after heat treatment.

Table H

| Stabilizer | Color values in acetonitrile solution | Color values in dimethyl formamide solution |
|---|---|---|
| Controls: | | |
| None (unheated resin solution) | 83.5 | 83.5 |
| None (heated resin solution) | 76.5 | 60.0 |
| Triorgano-phosphorus compounds: | | |
| Tributyl phosphite | 86.5 | 74.5 |
| Triisooctyl phosphite | 84.5 | 72.0 |
| Other stabilizers: Dibutyl phosphite | 79.0 | 65.5 |

EXAMPLE VIII

A series of resin solutions was prepared in a manner similar to that described in Example I using the same resin and solvent, and described therein each containing one of the following stabilizers: 1 percent tributyl phosphite, 1 percent trihexyl phosphite, 1 percent triisooctyl phosphite and 2 percent triisooctyl phosphite. One resin solution was also prepared containing no stabilizer. From these resin solutions staple fibers were obtained by identical extrusion and coagulation procedures in accordance with conventional spinning techniques. The fibers were tested for light stability by measuring the percent reflectance of monochromatic light at a wavelength of 440 millimicrons. Readings were taken initially and at twenty-hour intervals for a total period of 80 hours' exposure in an Atlas Fade-Ometer. The results obtained are set forth below in Table I, wherein "reflectance values" represent the percent light reflectance of each fiber after exposure in the Atlas Fade-Ometer for the indicated periods of time, with high "reflectance values" being preferred. Also tabulated for each fiber is the percent drop in light reflectance after 80 hours' exposure, calculated as follows:

$$\frac{\text{Reflectance value (0 hours)} - \text{Reflectance value (80 hours)}}{\text{Reflectance value (0 hours)}}$$

$\times 100 =$ percent drop in reflectance (after 80 hours)

*Table I*

| Stabilizer | Reflectance values | | | | | Percent drop in reflectance |
|---|---|---|---|---|---|---|
| | 0 hrs. | 20 hrs. | 40 hrs. | 60 hrs. | 80 hrs. | |
| None | 63 | 50 | 41 | 35 | 31 | 50.0 |
| 1 percent tributyl phosphite | 72 | 64 | 58 | 54 | 49 | 31.9 |
| 1 percent trihexyl phosphite | 74 | 66 | 63 | 58 | 53 | 28.4 |
| 1 percent triisooctyl phosphite | 78 | 71 | 65 | 61 | 56 | 28.2 |
| 2 percent triisooctyl phosphite | 79 | 76 | 71 | 67 | 66 | 16.4 |

The effectiveness of the stabilizers of this invention can be seen from the above table as represented by the drop in reflectance values over the 80-hour period, which is a measure of the increased darkening or yellowing of the fibers. The fibers containing the stabilizers show considerably less discoloration with time, i.e. lower percent drop in reflectance values, when exposed to light as compared with fibers containing no stabilizer.

What is claimed is:

1. A stabilized resin solution comprising an inert organic solvent solution of a resin copolymer of acrylonitrile with at least one member selected from the group consisting of vinyl chloride and vinylidene chloride, said copolymer containing in polymerized form from about 15 percent to about 70 percent by weight of the chlorine-containing monomer, said resin solution incorporating as a stabilizer therein a triorgano phosphine represented by the formula

wherein R, R¹ and R² represent hydrocarbyl radicals containing up to 12 carbon atoms, said triorgano phosphine being incorporated in said resin solution in an amount effecting a concentration therein of from about 0.01 percent to about 1 percent by weight of phosphorus based upon the weight of resin.

2. The stabilized resin solution as claimed in claim 1 wherein the triorgano phosphine is tributyl phosphine.

3. The stabilized resin solution as claimed in claim 1 wherein the triorgano phosphine is triphenyl phosphine.

4. A stabilized resin solution comprising an inert organic solvent solution of a resin copolymer of acrylonitrile with at least one member selected from the group consisting of vinyl chloride and vinylidene chloride, said copolymer containing in polymerized form from about 15 percent to about 70 percent by weight of the chlorine-containing monomer, said resin solution incorporating as a stabilizer therein a triorgano phosphinite represented by the formula

wherein R, R¹ and R² represent hydrocarbyl radicals containing up to 12 carbon atoms and wherein the radical represented by R² is attached to the vicinal oxygen atom of said triorgano phosphinite by an aliphatic carbon atom, said triorgano phosphinite being incorporated in said resin solution in an amount effecting a concentration therein of from about 0.01 percent to about 1 percent by weight of phosphorus based upon the weight of resin.

References Cited in the file of this patent

UNITED STATES PATENTS

| 2,456,216 | Richter | Dec. 14, 1948 |
| 2,564,646 | Leistner et al. | Aug. 14, 1951 |
| 2,824,845 | Kosmin | Feb. 25, 1958 |
| 2,834,798 | Hechenbleikner et al. | May 13, 1958 |
| 2,867,594 | Hanson et al. | Jan. 6, 1959 |
| 2,878,227 | Ucci et al. | Mar. 17, 1959 |
| 2,878,229 | Jenkins et al. | Mar. 17, 1959 |
| 2,885,377 | Knowles et al. | May 5, 1959 |
| 2,894,923 | Graham | July 14, 1959 |
| 2,946,764 | Toy et al. | July 26, 1960 |

FOREIGN PATENTS

| 1,119,752 | France | Apr. 9, 1956 |